Patented Jan. 9, 1951

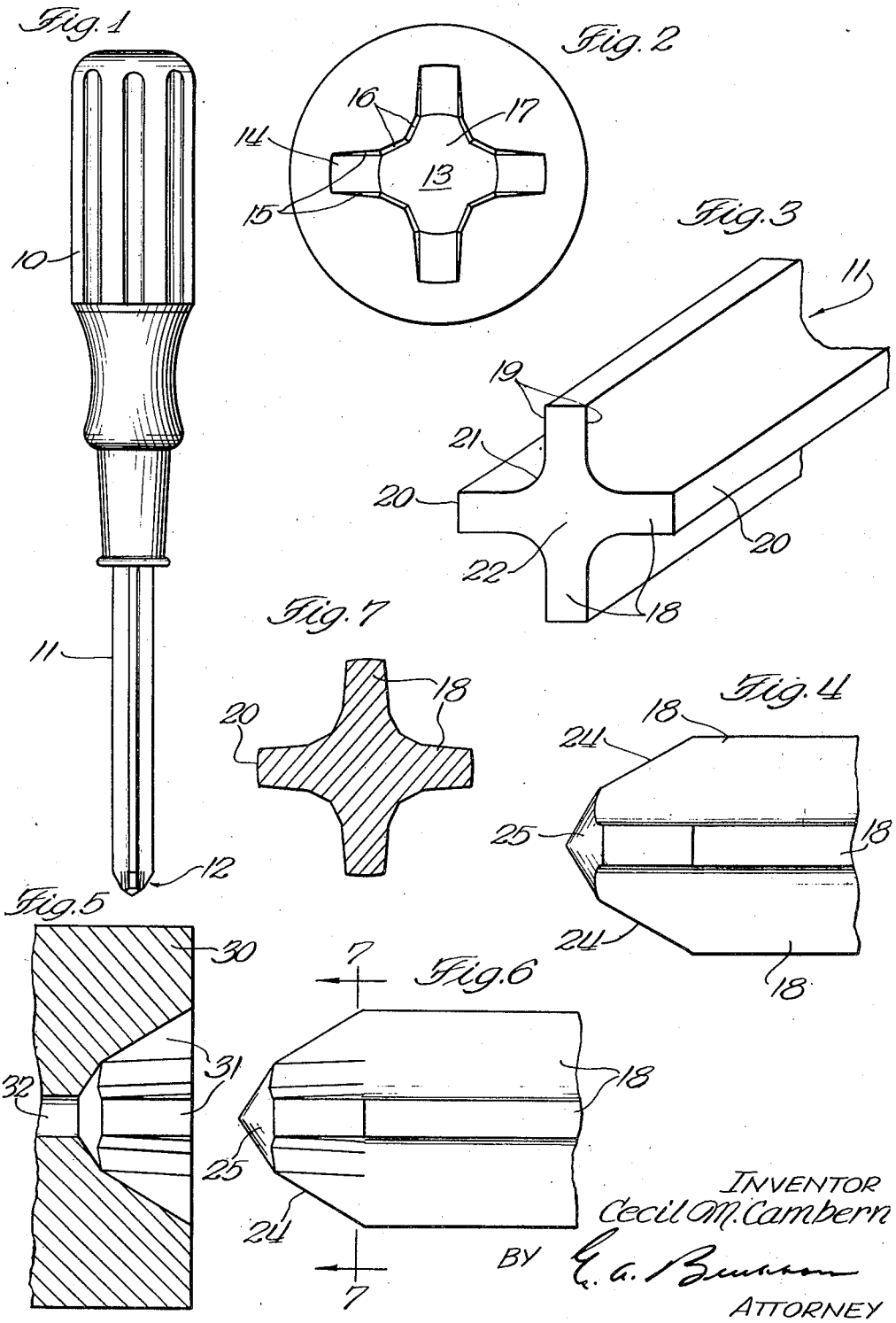

2,537,029

UNITED STATES PATENT OFFICE 2,537,029

METHOD FOR MANUFACTURING SCREW DRIVERS

Cecil M. Cambern, Portland, Oreg., assignor to Phillips Screw Company, a corporation of Delaware Application August 6, 1946, Serial No. 688,649

2 Claims. (Cl. 76—107)

The present invention relates to screw drivers and bits particularly adaptable for use in driving screws and the like fastening devices provided with a driver engaging recess in the head thereof.

A general object of the present invention is to provide new and improved drivers or bits for recessed head screws and the like fastening devices having recess engaging portions more accurately formed than are obtained by production methods heretofore employed.

A further object is to provide drivers and bits for recessed head screws having improved wearing qualities.

Another object is to provide new and improved drivers and bits of the class described and at lower cost than comparable products now being used.

A still further object of the present invention is to provide a new and improved method for manufacturing screw drivers and bits of the type shown, for example, in the patent to Phillips et al. 2,046,840.

And another object of the present invention is to provide a new and improved method of manufacturing screw drivers and bits of the type referred to above with a greater degree of uniformity and accuracy and also at a greatly reduced cost.

In accordance with the present invention drivers and bits are made from rod stock first rough shaped to a cross sectional configuration corresponding to the plan shape of the screw recess and the bit end of short lengths of the rod is then given the final shape by forcing it into the cavity of a forming die having a shape identical to the screw recess.

Further objects and advantages of the invention will appear from the following description taken in connection with the accompanying drawings while the features of novelty will be pointed out with greater particularity in the appended claims.

Referring to the drawings, Fig. 1 is an elevation of a screw driver constructed in accordance with one form of the present invention; Fig. 2 is a plan view illustrating a typical screw head recess; Fig. 3 is a fragmentary view in perspective illustrating a section of a rod formed for use in screw drivers of the present invention; Fig. 4 is an enlarged elevation of the end portion of a partially formed driver; Fig. 5 is a cross sectional view of a forming die used in carrying out the method of the present invention; Fig. 6 is a fragmentary elevation illustrating the end portion of a driver manufactured in accordance with the present invention; Fig. 7 is a cross sectional veiw taken along the line 7—7 of Fig. 6.

The above mentioned Phillips patent discloses a driver for use with a now common form of recessed head for screws and the like fastening devices, the recess being of a generally cruciform plan and defined by a plurality of sloping, angularly disposed plane faces. The recesses are formed in the screw head by a cold forging process in an automatic heading machine. The faces of the driver bit are shaped so as cooperatively to fit snugly into the recess in order that the screw will be held by frictional resistance between the adjacent surfaces onto the end of the bit throughout movement thereof in any direction. Square engagement between all of the adjacent faces of the driver bit and the screw recess is important in order that the driving force be distributed over the maximum possible area of contact whereby the life of the driver is prolonged to the maximum possible extent.

Because of the angle of the slope of the side walls of the recess it is necessary to provide an identical angle of taper on the various faces of the driver bit for reasons as above stated. Screw drivers and bits for this type of screw recess are now commonly manufactured from solid steel rod by a plurality of machining operations and which inherently results in a high unit cost. Since the accuracy of the finished product depends upon the care with which the machine is set and maintained in operating condition, continuous supervision of the operation of the machine and careful checking and inspection of the product is required. As distinguished from the prior practice, screw drivers and bits of the present invention are made from a continuous or long length of blank rod or bar stock manufactured with a cross sectional configuration corresponding substantially to the cross sectional configuration of the screw head recess. Screw recess engaging faces are formed on the ends of cut lengths of the rod or bar by forcing the same relatively into a cavity in an impact forming die the force of impact being sufficient to cause the metal of the rod or bar end to completely fill the die cavity thereby producing a plurality of sloping angular faces which will fit cooperatively snugly into the screw head recess. The cut lengths are then heat treated or hardened and mounted in suitable handles.

Referring now to the drawings, in Fig. 1 is shown a side elevation of a screw driver constructed in accordance with the present invention and comprising a handle 10 and a tool element 11 mounted therein the tool element having a screw recess engaging bit portion 12 on the lower end thereof. While the invention will be described with particular reference to a screw driver suitable for use in driving screws of the type shown in the Phillips et al. patent 2,046,839, it will be obvious to those skilled in the art that the present invention is not to be necessarily so limited since drivers and bits may equally well be manufactured in accordance with the present disclosure for use with many different forms of socketed head screws and other fastening devices.

Hence, reference is made herein to the Phillips type recess and driver only by way of illustration and not by way of limitation.

In Fig. 2 of the drawings is shown an enlarged plan view of a head of a screw or other fastening device provided with a generally conical recess 13 comprising a plurality of radially extending slots defined by the outer end walls 14 which are inclined inwardly toward the axis of the recess at the bottom thereof and by opposite side walls 15, the opposite side walls of each pair of adjacent slots merging with a pair of intermediate angular contiguous wall portions 16. The opposite side walls 15 diverge from each other from their outermost portions in the direction inwardly toward the axis of the recess and also taper inwardly towards each other where they meet with the outer wall 14 toward the bottom of the recess. The intermediate wall portions 16 also taper inwardly toward the axis of the recess at the lower end thereof. The bottom 17 of the recess is bluntly concave.

Referring now to Fig. 3, a section of rod is illustrated which has been formed for use in making drivers according to the present invention. The rod comprises a plurality of radially extending vanes 18 which, in this instance are four in number and arranged at right angles with respect to each other. The vanes 18 are defined by the opposite side walls 19 and an outer wall 20 extending therebetween the side walls of each adjacent pair of vanes 18 merging with a concave bottom wall 21 extending therebetween. All of the walls 19, 20 and 21 extend parallel with the longitudinal axis of the rod. It will be observed that the side walls 19 diverge from each other from the outer wall 20 and more particularly adjacent their innermost portions toward the axis of the rod whereby a relatively heavy core section 22 is provided for the tool element. This is of considerable importance in order that the driver tool will possess sufficient torsional rigidity to permit driving of screws without undue twisting of the shank portion. It is to be understood that the cross sectional shape of the rod 13 need be only a rough approximation of the cross sectional shape of the screw head recess adjacent its upper portion and considerable latitude is permissible. It is preferred, however, that the maximum diameter of the rod 11 correspond substantially to the maximum diameter of the screw head recess at the upper end thereof and that the thickness of the vanes 18 be substantially equal to the width of the slots between the side walls 15 of the screw head recess as indicated in Fig. 2. The blank rod stock may be made in long continuous lengths either by cold rolling in a rolling mill with shaped rolls or by drawing through a suitable forming die. It may be desired to form the rod roughly to shape by rolling and to draw it to the final desired dimension. The rod or bar thus formed may be supplied in long lengths to the screw driver manufacturer who may perform the remaining manufacturing steps.

For making a driver for use with the particular recess shown in Fig. 2, the end of the rod or bar is first tapered either by grinding or by shaving as illustrated in Fig. 4 in which the outer end walls of the vanes 18 are cut back to provide outer end surfaces 24 which are inclined at an angle corresponding substantially to the angle of inclination of the recess slot walls 14. The core section of the rod or bar is also tapered as indicated at 25 to an angle of taper corresponding substantially with the concavity of the bottom wall 17 of the recess. This operation may be performed on an automatic screw machine which may simultaneously sever the desired lengths from the continuous length of rod or bar.

The pointed end of the pieces as illustrated in Fig. 4, is then forced relatively into a cavity or recess 31 provided in a forming die 30 as illustrated in Fig. 5 with the vanes in parallel alignment with the radial slots of the die. The cavity 31 has a configuration and dimensions substantially identical to the recess 13 provided in the screw head. The cavity 31 may, if desired, be somewhat deeper than the screw recess 13 but the lower or innermost portion of the cavity 31 should not be smaller than the corresponding portion of screw recess for the reason that the end of the driver should not bottom in the screw recess before full engagement is had between all of the side wall surfaces. The end of the rod is forced into the die cavity with a sufficient pressure so that metal of the rod will flow as may be necessary to fill completely the die cavity whereupon surfaces will be formed upon the opposite sides of the vane ends corresponding identically to the tapered side walls of the cavity as indicated in Fig. 6. An axial opening 32 is provided in the die communicating with the bottom of the cavity 31 into which any excess metal may flow in the event that the cross section of the rod 11 may be somewhat greater than the mean cross section of the cavity resulting in a considerable quantity of excess metal which must be displaced in the formation of the screw engaging surfaces on the bit end of the tool element. Such excess metal may readily be removed following the cold forging or shaping operation.

It will be obvious to those skilled in the art that the screw engaging bit surfaces formed on the end of the rod will conform identically to the configuration of the cavity 31 and since this cavity corresponds with the screw head recesses the driver bit must inherently also fit with a high degree of accuracy into the screw recesses. The die cavity may be periodically checked for wear but until excess wearing occurs all drivers manufactured will be of uniform standard shape and dimensions. It is contemplated that the cold forging of the driver ends by means of dies such as 30 be performed on a suitable cold heading machine of the type such as are now in common usage in the screw manufacturing industry. After the heading operation has been performed the rod sections may be heat treated to provide the requisite hardness and mounted in handles or other suitable holders. By forming the end of the driver in a die such as 30 a certain amount of work hardening takes place in that the metal of the end of the rod is compressed to a considerable extent upon being forced into the die cavity. It has also been noted that by compressing the bit end of the rod by forcing it into a die, the screw engaging surfaces are given a high polish indicating that all minute surface irregularities in the bit faces have been smoothened out. This is important for the reason that it has been observed that failures in driver bits nearly always initiate at small fissures present in the screw engaging surfaces and progress therefrom through the vane. Such fissures or surface irregularities, appearing as fine scratches, may be the result of the rolling, milling, or machining operation in formation of the blank. In this regard it has been observed that the life and wearing qualities of a conventional machine or milled bit is materially improved by subjecting the bit to a final forming or compression operation by forcing the same into a die cavity, as described. Whether the improved life and wearing qualities of a driver bit in which the screw engaging faces are finally formed by forcing the tip of the bit into a die cavity is the result of work-hardening of metal, or due to the elimination of surface irregularities, or to a combination of such factors and others, cannot be definitely established but it has been definitely proven that by forcing the bit end of a driver, previously rough formed, by either a rolling, machining or milling operation, in order to reduce the cross-section of the bit vanes to final dimensions and for forming the final recess engaging surfaces, that the normal useful life of the driver can be increased by at least ten per cent.

Having described the invention in what are considered to be preferred embodiments thereof it is desired that it be understood that the details shown and described are merely illustrative and that the invention may be carried out by other means.

What I claim is:

1. The method of making a driver for use with screws and the like fastening devices having head recesses of polygonal plan and including a plurality of radial slots with ridges extending therebetween, the outer walls of said slots being inclined inwardly toward the axis of said recess, the opposite side walls of said slots defining said ridges being tapered inwardly toward the bottom of said recess, said method comprising the steps of forming a blank rod having a polygonal cross sectional configuration and dimensions substantially identical with the cross sectional shape and dimensions of the screw recess adjacent the upper end thereof and comprising a plurality of radially extending vanes, the opposite side walls of said vanes extending parallel with the longitudinal axis of said rod throughout the full length thereof, tapering the outer end walls of said vanes inwardly toward the axis of said rod at an angle corresponding substantially to the angle of taper of the outer slot walls of the screw recess, forcing the end of said rod while cold relatively into a forming cavity having a configuration substantially identical with the screw recess and with sufficient pressure to compress the vanes and reduce the cross-sectional thickness thereof and to form tapered screw engaging faces on the end of said rod for fitting cooperatively and snugly into the screw recess.

2. The method of making a driver for use with screws and the like fastening devices having head recesses of polygonal plan and including a plurality of radial slots with ridges extending therebetween, the outer walls of said slots being inclined inwardly toward the axis of said recess, the opposite side walls of said slots defining said ridges being tapered inwardly toward the bottom of said recess, said method comprising the steps of providing a forming cavity in a die, the lowermost portion of said cavity having a configuration and dimensions substantially identical with the screw recess, forming a blank rod having at least one end portion of cruciform cross-sectional configuration substantially identical with the cross-sectional shape of the screw recess adjacent the upper end thereof and comprising a plurality of radially extending vanes, said rod including said end portion being of uniform diameter throughout its length, said cruciform shaped end portion having a length materially greater than the depth of said forming cavity, tapering said one end of said rod to provide taper on the outer end walls of said vanes, extending inwardly toward the axis of said rod at an angle corresponding substantially to the angle of taper of the outer slot walls of the screw recess, forcing the end of said rod while cold relatively into said forming cavity and with sufficient pressure to compress said end portion and to form screw engaging faces on said rod end portion for fitting cooperatively and snugly into the screw recess.

CECIL M. CAMBERN.

REFERENCES CITED

The following references are of record in the file of this patent:

UNITED STATES PATENTS

| Number | Name | Date |
|---|---|---|
| 228,485 | Sweet | June 8, 1880 |
| 961,184 | Walker | June 14, 1910 |
| 1,139,392 | Wood | May 11, 1915 |
| 2,046,840 | Phillips et al. | July 7, 1936 |
| 2,066,372 | Tomalis | Jan. 5, 1937 |
| 2,116,775 | Blackburn | May 10, 1938 |
| 2,142,239 | Cook | Jan. 3, 1939 |
| 2,159,842 | Cook | May 23, 1939 |
| 2,317,319 | West | Apr. 20, 1943 |
| 2,366,682 | West et al. | Jan. 2, 1945 |

FOREIGN PATENTS

| Number | Country | Date |
|---|---|---|
| 486,294 | France | Dec. 28, 1917 |